United States Patent
Bahl et al.

(10) Patent No.: US 10,693,524 B2
(45) Date of Patent: Jun. 23, 2020

(54) SYSTEM AND METHOD FOR MECHANICALLY-BASED MAGNETIC-FIELD TRANSMITTER

(71) Applicant: The Board of Trustees of the University of Illinois, Urbana, IL (US)

(72) Inventors: Gaurav Bahl, Champaign, IL (US);
Sameh Tawfick, Champaign, IL (US);
Rhinithaa P Thanalakshme, Urbana, IL (US); Ali Kanj, Urbana, IL (US);
Inbar Grinberg, Urbana, IL (US);
Jennifer Bernhard, Urbana, IL (US)

(73) Assignee: UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 16/352,090

(22) Filed: Mar. 13, 2019

(65) Prior Publication Data

US 2019/0288746 A1    Sep. 19, 2019

Related U.S. Application Data

(60) Provisional application No. 62/643,902, filed on Mar. 16, 2018.

(51) Int. Cl.
*H04B 5/00* (2006.01)
*H02K 1/27* (2006.01)

(52) U.S. Cl.
CPC ......... *H04B 5/0031* (2013.01); *H02K 1/2706* (2013.01)

(58) Field of Classification Search
CPC ...... H02K 1/27; H02K 1/2706; H04B 5/0031; H01L 24/78; H01L 24/85; B23K 20/10
See application file for complete search history.

(56) References Cited

U.S. PATENT DOCUMENTS

| | | | | |
|---|---|---|---|---|
| 4,571,688 A | * | 2/1986 | Kashihara | B23K 20/10 700/212 |
| 4,824,005 A | * | 4/1989 | Smith, Jr. | H01L 24/78 228/1.1 |

* cited by examiner

*Primary Examiner* — Thanh C Le
(74) *Attorney, Agent, or Firm* — Benesch, Friedlander, Coplan & Aronoff LLP (57) ABSTRACT

The present disclosure provides a device and method for producing low-frequency magnetic-field signals to enable long-range wireless communication through conductive media. The magnetic-field signals can be generated by mechanically moving permanent magnets. In some examples, transmitters are capable of transmitting signals in the ultra-low and very-low frequency ranges (e.g., 100 Hz-30 kHz), utilizing a small amount of power.

20 Claims, 8 Drawing Sheets

SYSTEM AND METHOD FOR MECHANICALLY-BASED MAGNETIC-FIELD TRANSMITTER

CROSS-REFERENCE TO RELATED APPLICATION

This application claims the benefit of U.S. Provisional Application Ser. No. 62/643,902, filed Mar. 16, 2018, which is incorporated in its entirety herein.

STATEMENT REGARDING FEDERALLY SPONSORED RESEARCH OR DEVELOPMENT

This invention was made with government support under HR0011-17-2-0057 awarded by the Department of Defense. The government has certain rights in the invention.

BACKGROUND

Radio frequencies at the very low end of the electromagnetic spectrum can be useful for a number of defense applications. Ultra-Low Frequencies (ULF), e.g., from 100 Hz to 3 kHz, are particularly useful for penetration of signals through conductive media such as water, metal, soil, rock, and building materials. Penetration is possible due to the relatively large skin depth in these materials which grows as the carrier frequency is reduced. The Very Low Frequency (VLF), e.g., from 3 kHz to 30 kHz, band is likewise of interest for defense communications because signals in this frequency range couple to the ionosphere-ground waveguide surrounding the Earth. The waveguide can facilitate the long range propagation of signals around the globe with very little attenuation. However, the free-space wavelengths of electromagnetic fields at ULF and VLF frequencies measure tens to thousands of kilometers in length, resulting in either very large or severely inefficient transmitter structures when constructed using conventional antenna approaches. Such transmitters may be impractical in many operational scenarios, especially those requiring physical mobility.

BRIEF DESCRIPTION OF THE DRAWINGS

The features, objects and advantages other than those set forth above will become more readily apparent when consideration is given to the detailed description below. Such detailed description makes reference to the following drawings, wherein.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

DETAILED DESCRIPTION

The systems, devices and methods now will be described more fully hereinafter with reference to the accompanying drawings, in which some, but not all embodiments of the invention are shown. Indeed, the systems, devices and methods may be embodied in many different forms and should not be construed as limited to the embodiments set forth herein; rather, these embodiments are provided so that this disclosure will satisfy applicable legal requirements.

Likewise, many modifications and other embodiments of the systems, devices and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

Figure 1A:
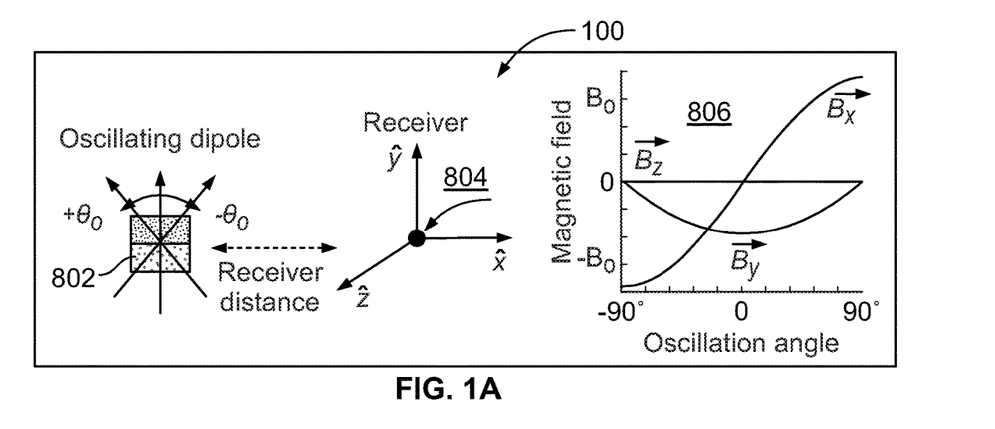
FIG. 1A is a schematic of an example mechanically-based transmitter and accompanying graph.

FIG. 1A is a schematic of an example mechanically-based transmitter 100 and accompanying graph. A rotor magnet 802 produces an oscillating magnetic field 806 at a receiver location 804. Any one of a variety of magnetic field sensors may be used as a receiver, e.g. a magnetometer or a wire loop, e.g., depending on signal strength at the receiver location. In some examples, the rotor magnet 802 includes a permanent magnet. The rotor magnet 802 and/or the stator magnets 800 can include a pair of equal and oppositely magnetized poles, e.g., north and south. An arrow shows the magnetic dipole moment. The x-component or the y-component of the magnetic field 806 can be measured at the receiver 804. The rotor magnet 802 is rotationally/torsionally oscillated to undergo periodic angular motion, to create a time-periodic oscillation of the magnetic dipole and corresponding oscillation of the magnetic field generated by the dipole.

Figure 1B:
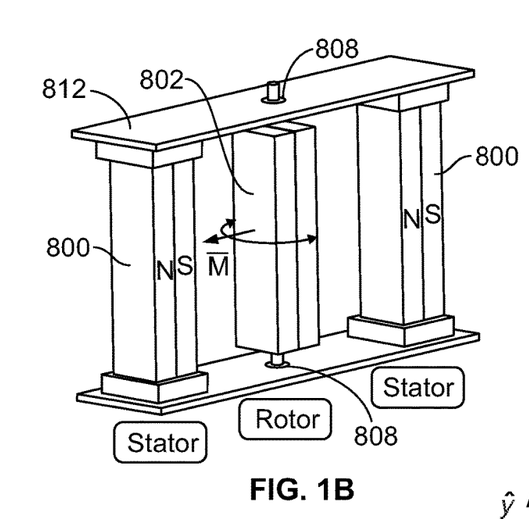
FIG. 1B shows an example transmitter including bar magnets that are able to undergo rotational motion through ball bearings or mechanical springs.
Figure 1C:
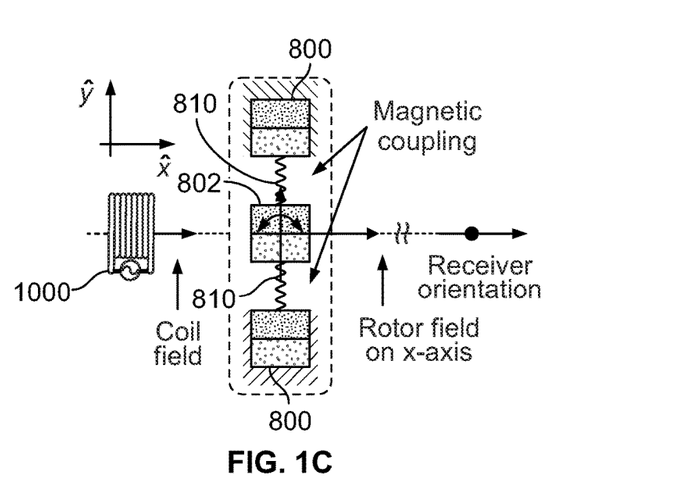
FIG. 1C shows an example transmitter including bar magnets that are able to undergo oscillatory rotational motion through magnetic springs.

FIG. 1B shows an example transmitter 100 including the rotor magnet 802 and stator magnets 800 supported by a frame 812. In some examples, the rotor magnet 802 is able to undergo rotational motion via ball bearings 808 positioned at either end of the rotor magnet 802 and connecting the rotor magnet 802 to the frame 812. FIG. 1C shows an example transmitter 100 including stator magnets 800, the rotor magnet 802 and a driving coil 1000 that is able to provide controlled rotational motion to the rotor magnet 802 along with magnetic springs 810 that provide a position restoring torque to the rotor magnet 802 (e.g., the wavy lines represent the magnetic coupling between the rotor magnet 802 and stator magnets 800. For example, in FIGS. 1B and 1C, the stator magnets 800 produce a magnetic coupling and spring effect with the rotor magnet 802 that can add to any mechanical spring effect that may be present in the transmitter 100.

Figure 2:
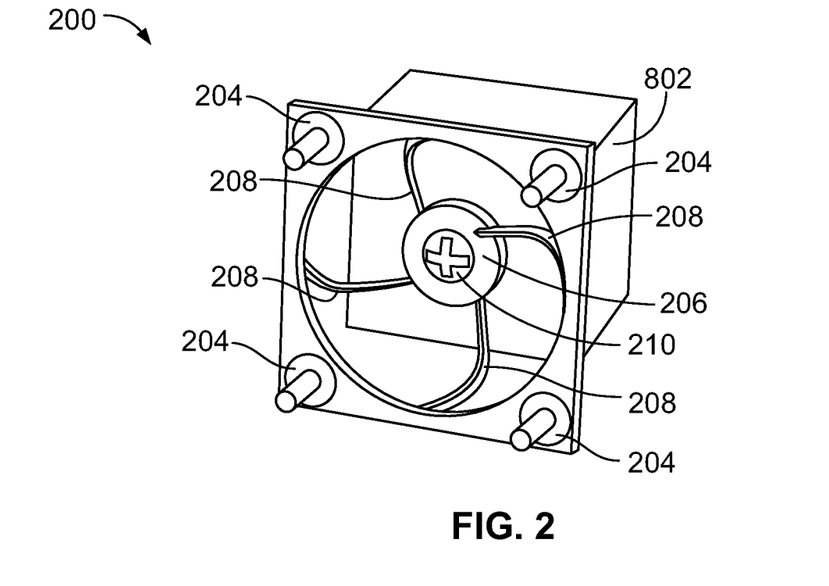
FIG. 2 is an example schematic of an example mechanical spring assembly that can support the rotor magnet while securing it to a frame of the transmitter.

FIG. 2 is an example schematic of an example mechanical spring assembly 200 that can support the rotor magnet 802 while securing it to a frame of the transmitter 100, e.g., using frame mounts 204 and a magnet mount 206 connected by torsional springs 208 (mechanical or magnetic). The mechanical spring assembly 200 provides a restoring torque that causes the rotor magnet 802 to have a mechanical resonance, e.g., for achieving torsional mode actuation. In some examples, the rotor magnet 802 can include neodymium magnets (e.g. N-52 or N-55 grade material), suspended on their long axis on bearings 802 (FIG. 1B) or torsional springs 208 (FIG. 2). The springs 208 may be made, for example, by precision laser-cut, or deep reactive ion etching, and in some embodiments can have integrated piezoelectric actuators. Example fabrications can also be based on a combination of high precision micro-milling and laser micro-machining. In some examples, the spring assembly 200 can be connected to the rotor magnet by screw 210. In some examples, the connections can be achieved either through bonding and/or guided press-fits.

Figure 3:
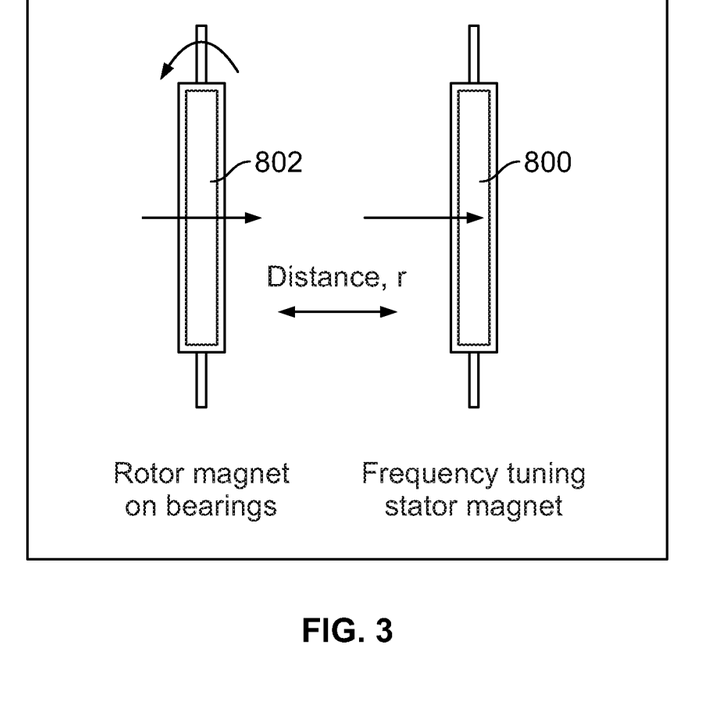
FIG. 3 is a schematic of an example magnetic spring setup, e.g., of FIG. 1B.

FIG. 3 is a schematic of an example magnetic spring setup, e.g., of FIGS. 1B and 1C. Adjusting the distance r between rotor magnet 802 and stator magnet(s) 800 can tune the restoring torque from the magnetic spring, and in turn adjust the resonant frequency of the transmitter 100.

Figure 4:
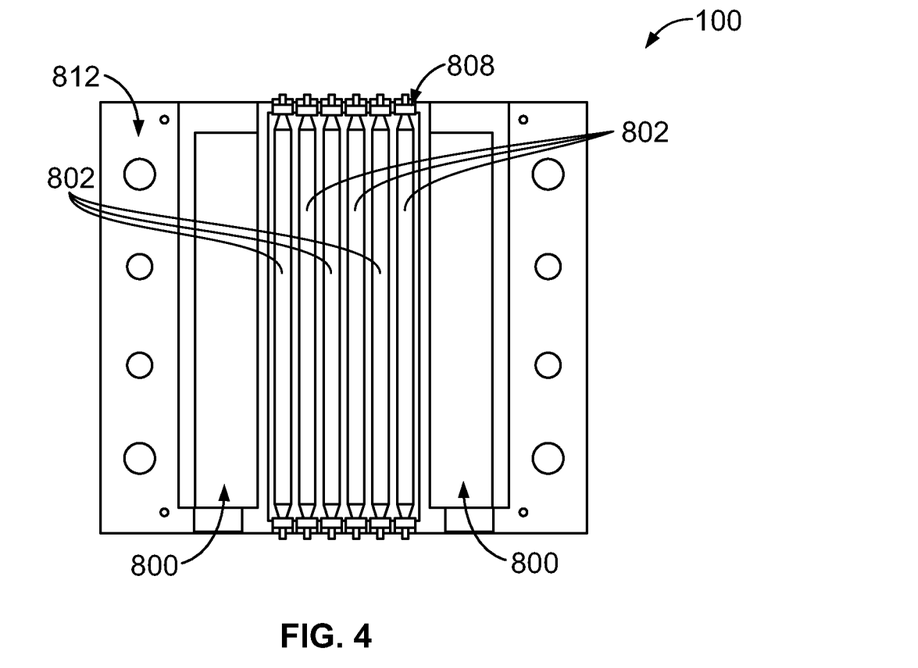
FIG. 4 is a schematic of an example assembly of a transmitter having multiple rotors.
Figure 5:
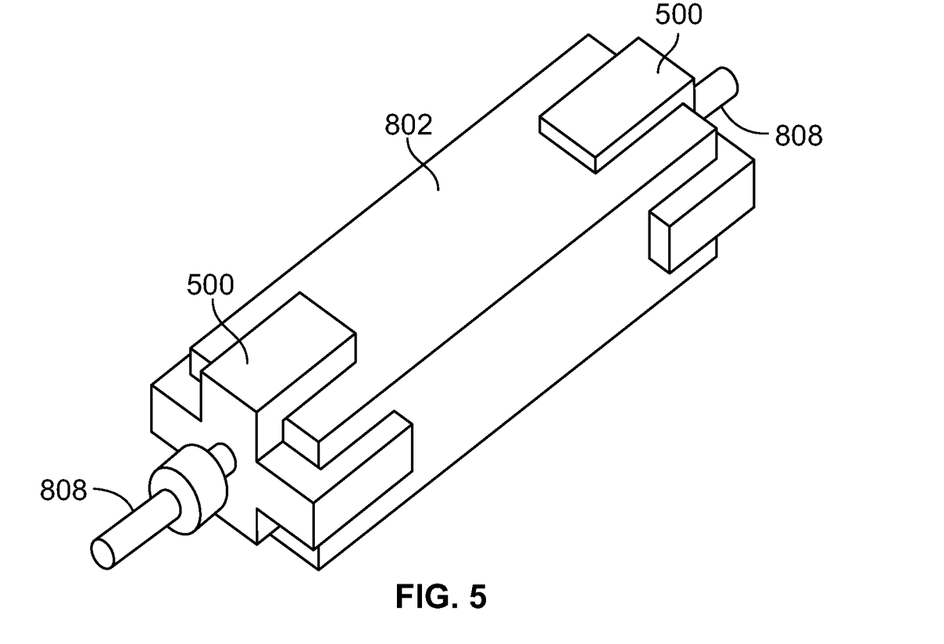
FIG. 5 is a schematic of an example setup for bearing-mounted bar magnet that functions as a rotor magnet.

FIG. 4 is a schematic of an example assembly of transmitter 100. In some examples, the transmitter 100 can include multiple rotor magnets 802, e.g., six, and multiple stator magnets 800, e.g., two. Other amounts of rotor magnets 802 and/or stator magnets 800 can be used, e.g., based on an implementation. In some examples, each of the rotor magnets 802 can be individually mounted to the frame 812 using ball bearings 808. In some examples, the stator magnets 800 can also be located inside the frame 812. FIG. 5 is a schematic of an example setup for bearing 808 mounted bar magnet that functions as the rotor magnet 802. In some examples, a ½"×½"×2" N52 magnet is supported by two aluminum end-caps 500, a shaft of diameter 2 mm and two precision ball bearings 808.

Figure 6:
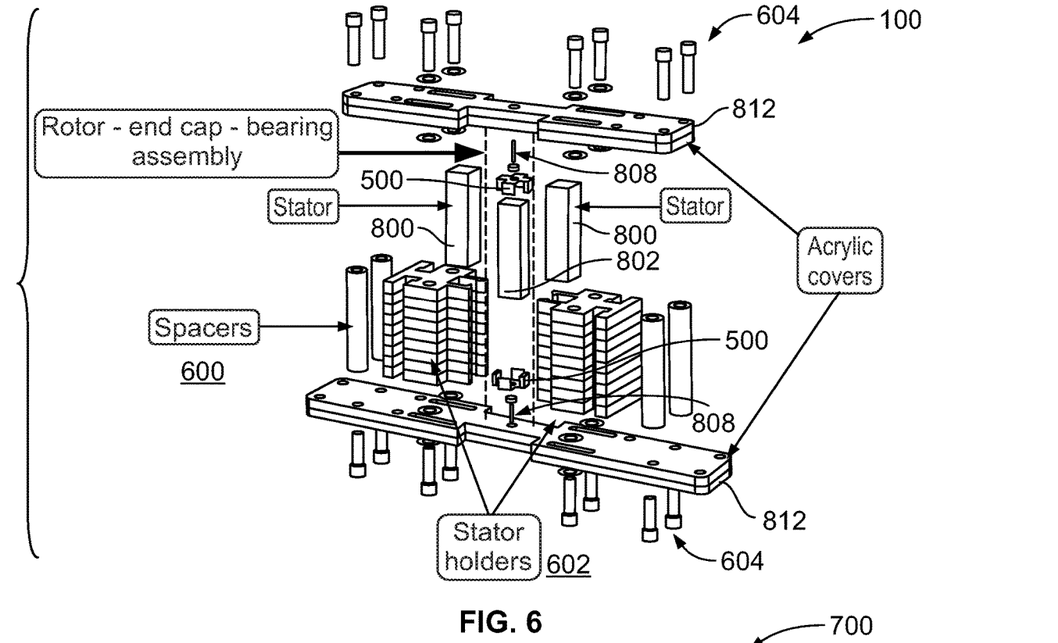
FIG. 6 is a schematic of an example transmitter.

FIG. 6 is a schematic of an example construction and assembly of the transmitter 100 with one oscillating rotor magnet 802. Geometrically identical N52 grade magnets with dimension ½"×½"×2" can be used as rotor magnets 802 and stator magnets 800. Other sized magnets can be used. In this example, the transmitter includes spacers 600, stator holders 602 and bolts 604 to provide additional structure to the frame 812. The shaft-bearing assembly can be fitted to the rotor magnets 802 using aluminum end caps 500. The frame 812 can be made using acrylic sheets with laser cut holes to mount the bearings. Stator magnets 800 are inserted into separate acrylic holders, and bolted in position with a fixed rotor-stator distance. An air-core coil 1000 made with enameled copper wire can positioned by the rotor magnet 802 to generate the drive torque to drive the rotor magnet 802 away from the stator magnets 800 (see, e.g., FIG. 1C). Additional or fewer parts can be used, e.g., depending on an implementation.

Example assembly steps include: Each magnet 802 can be fixed to the bearing 808 using end-caps 500 and shaft. The frame 812 covers and spacers can be fixed in a dedicated jig, and linear XYZ stages can be used to bring the rotor magnet 802 to its location, and bearings 808 are aligned with the corresponding holes on the frame 812. The stator magnets 800 are inserted into the stator holders 602. This sub-assembly can be inserted between the rotor magnet 802 and the spacer 600 in the frame. For multi-magnet systems, all the rotor magnets 802 can be placed on a separate assembly jig with proper inter-magnet spacing, and then be inserted into the frame 812. Finally, all the clamps can be released to suspend the rotor magnets 802.

In some examples, the transmitter 100 can generate a carrier signal, e.g., for low-frequency wireless communication using the rotor magnet 802 or other oscillating magnetic dipole. The rotor magnet 802 can be mounted on an axle that is allowed to undergo rotational motion. Rotation or back-and-forth periodic (or even non-periodic) oscillation of the axle generates a time-varying magnetic field at a receiver located some distance away. The restoring spring effect on the rotor can be produced by a mechanical spring and/or a magnetic spring in different embodiments, e.g., as described herein. In some examples, the mechanical spring and the magnetic spring can be used together, e.g., to obtain higher operation frequency. Actuation of the rotor magnet 802 and/or stator magnets 800 can be piezoelectrically-driven or driven by a magnetic field generated by current passing through the coil 1000 (e.g., FIG. 1C) positioned adjacent the rotor magnet 802 and/or stator magnets 800.

In some examples, the mechanically driven transmitter 100 can include one or more torsionally-oscillating neodymium magnets (rotor magnets 802) mounted on bearings 808. When the oscillation of the one or more rotor magnets 802 is driven by a magnetic field generated by the electrical driving coil 1000, the rotor magnet 802 rotates to align itself with the magnetic field generated by the driving coil 1000. This can include one or more stator magnets 800, e.g., "magnetic springs," to cause the rotor magnet 802 to return to its default position, e.g., magnetic restoring force of FIGS. 1B, 1C, and 3. The stator magnets 800 can be positioned near the rotor magnet 802 to create a strong enough magnetic field to cause the rotor magnet 802 to align with the field generated by the stator magnets 800 when there is no field being generated by the driving coil 1000. The magnet array can be driven synchronously, but may also self-synchronize through the mutual magnetic interaction between rotors. The oscillating rotor magnet 802 generates a stable "carrier" ac magnetic field at a fixed frequency (e.g., ULF range 0.1-1 kHz based on an implementation) which can be then modulated, e.g., as described below with FIGS. 8 and 9.

Figure 7:
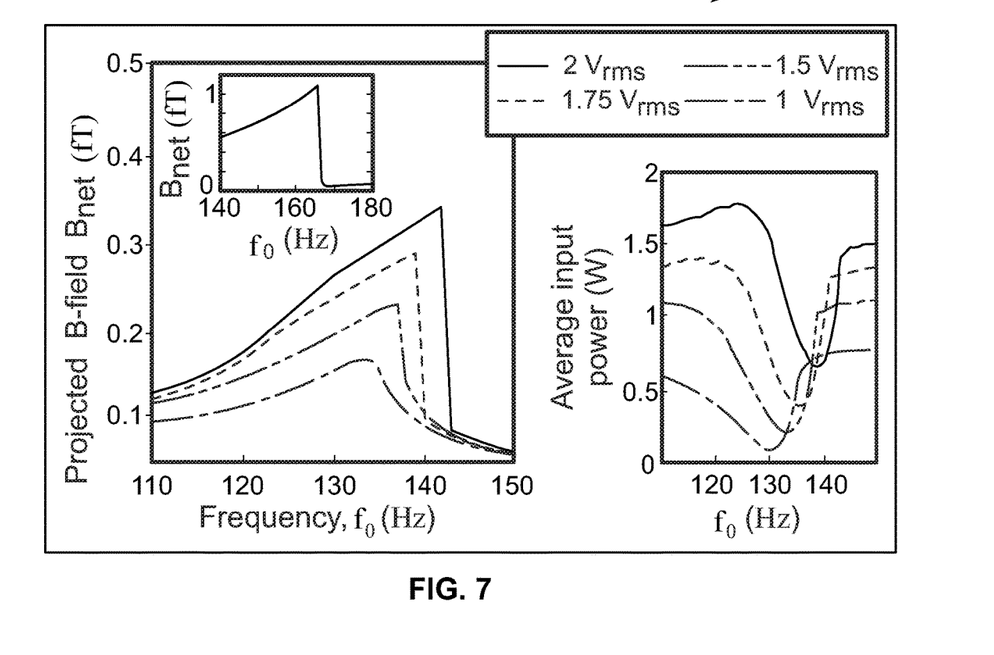
FIG. 7 includes graphs of an example frequency versus a magnetic field amplitude of the transmitter produced at the receiver, and power consumption of the transmitter.
Figure 8:
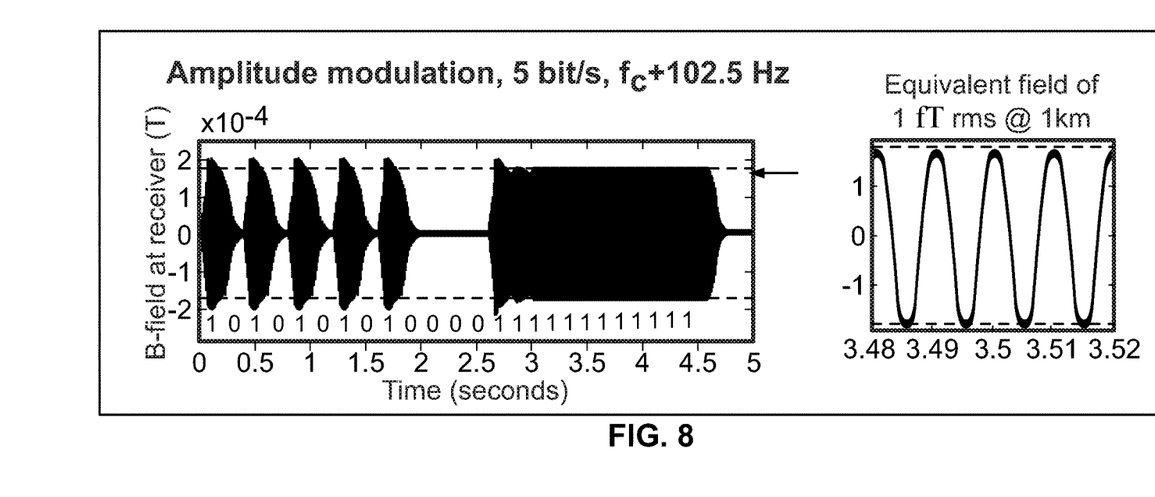
FIGS. 8 and 9 are example modulated time-domain signals measured from a fluxgate magnetometer receiver.
Figure 9:
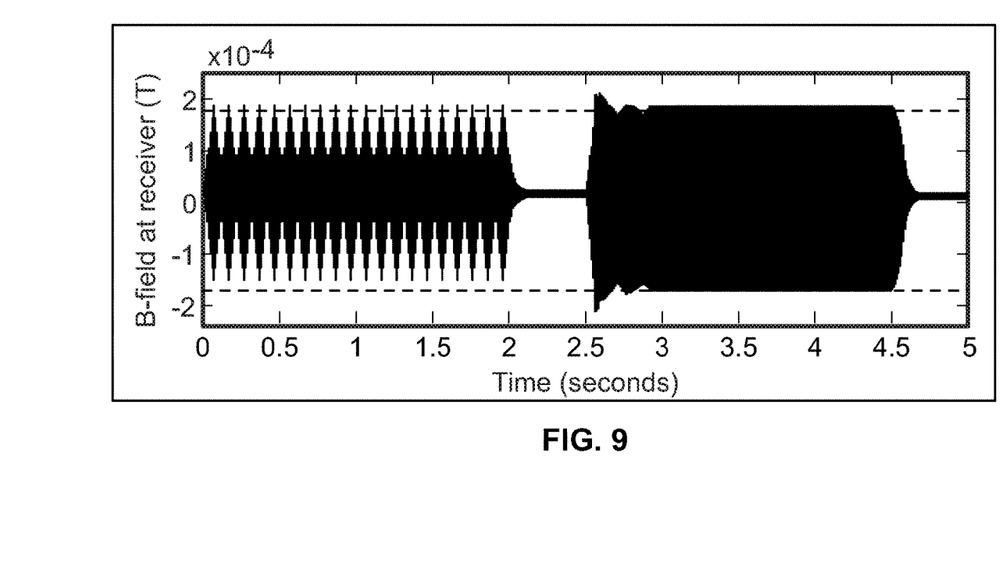
Figure 10A:
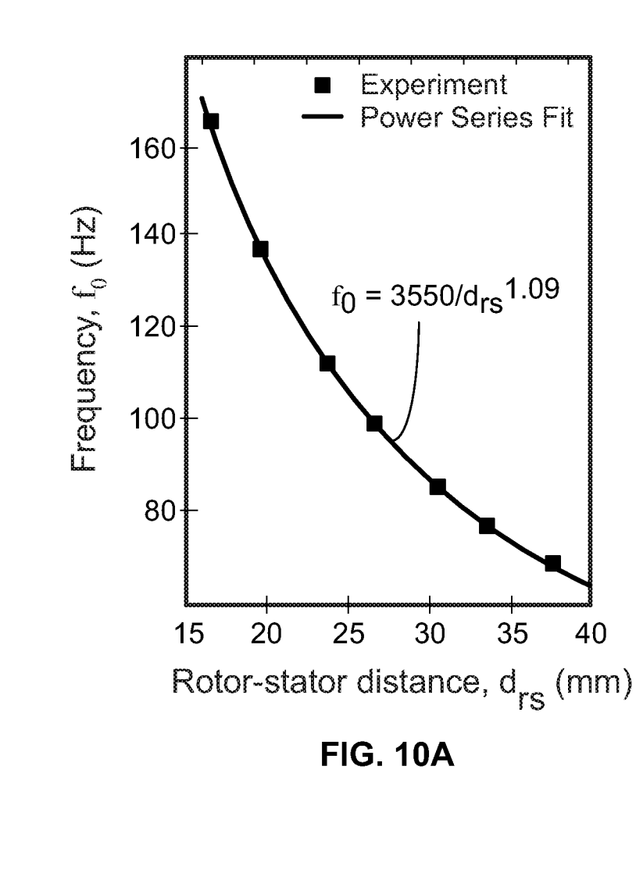
FIGS. 10A-B show two example techniques to change the operational frequency of the transmitter.
Figure 10B:
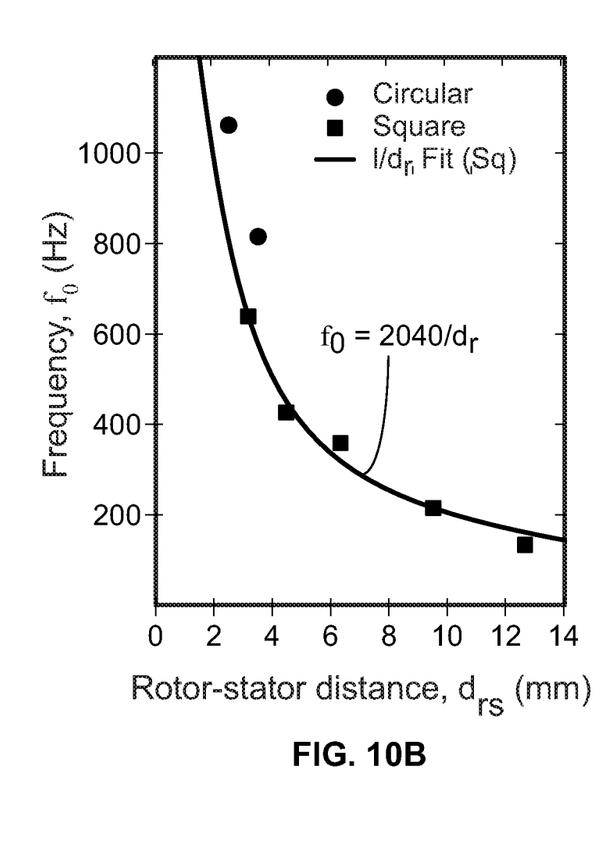

FIG. 7 includes graphs 700 of an example frequency versus a magnetic field amplitude of the transmitter 100 produced at the receiver 804, and power consumption of the transmitter 100. Each curve in in the left graph corresponds to the frequency response of the field generated by the transmitter sensed by a fluxgate sensor placed at 27 cm by sweeping the drive frequency from 100-200 Hz and supplying the drive coil 1000 with a constant ac voltage. The curves in the right graph are the corresponding power consumed by the transmitter due a constant drive voltage. The field generated reaches a maximum near the mechanical resonance of the rotor magnet 802, while the power reaches a minimum at the same instant. FIGS. 8 and 9 are graphs of example measured field from a fluxgate magnetometer receiver at a 20 cm distance, 5 bit/s, and at a 20 cm distance, 20 bit/s, respectively. The steady-state carrier signal produced by the transmitter has an equivalent strength of 1 fT rms (at 1 km distance). An example amplitude modulation of this carrier signal is implemented using a On-Off Keying scheme, e.g., by turning on and off the drive voltage to the drive coil 1000. The presence and absence of the drive voltage is indicated with the binary "1" and "0" respectively in FIG. 8. FIGS. 10A-B show two example techniques to change the operational frequency of the transmitter 100. In FIG. 10A, the distance between the rotor magnet 802 and stator magnet 800 is changed to alter the torsional stiffness. In FIG. 10B, the rotor magnet geometry (square/circular cross-section) and its dimension are changed to alter the moment of inertia to increase the operating frequency.

Figure 11:
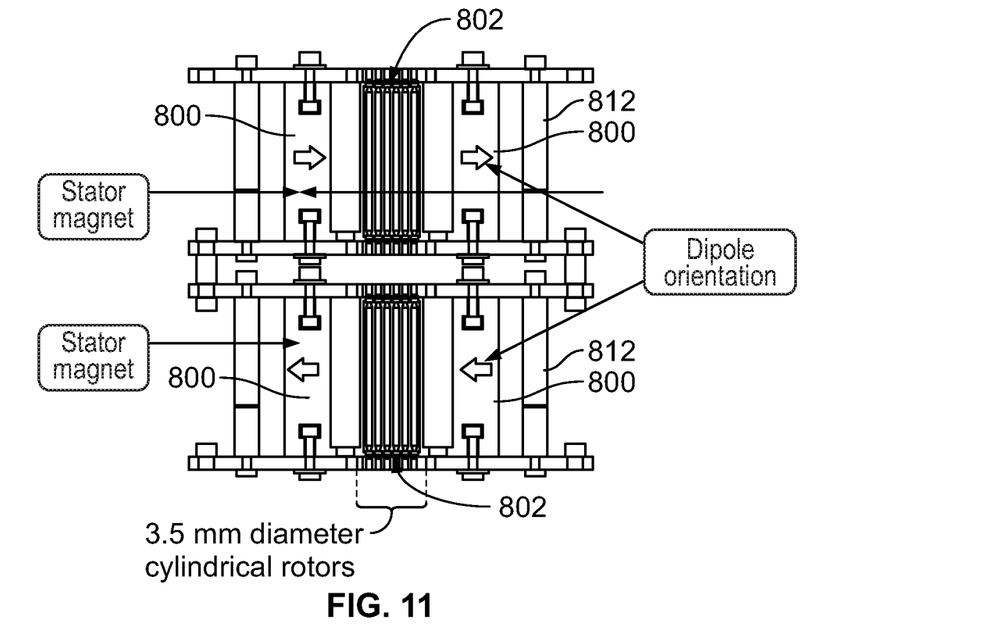
FIG. 11 is an example of a twelve-rotor magnet transmitter, e.g., by combining two transmitters with six rotor magnets each.
Figure 12:
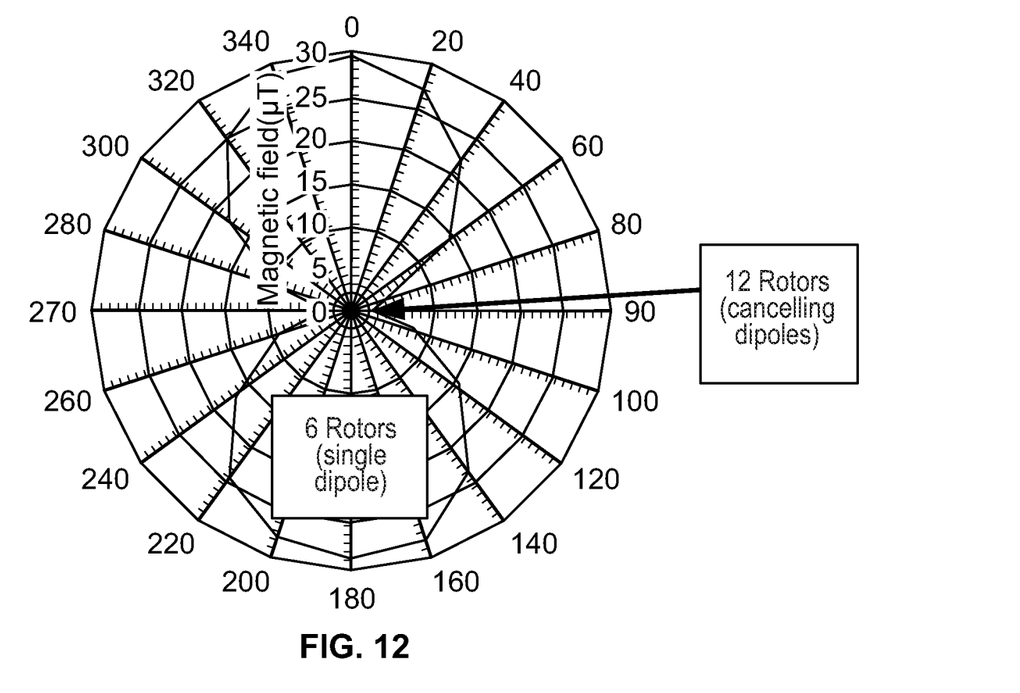
FIG. 12 is an example polar plot of dc magnetic field comparison around a six-magnet system and twelve-magnet system with opposing dipole orientation.
Figure 13:
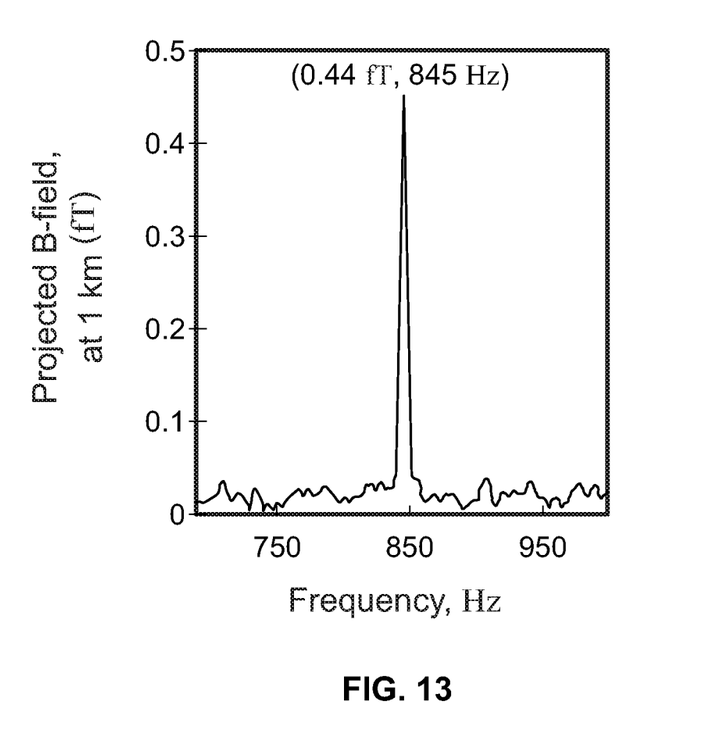
FIG. 13 is an example spectrum of magnetic field produced by the twelve-magnet system measured using Cesium magnetometer.

FIG. 11 is an example of a 12-rotor magnet transmitter 100, e.g., by connecting two transmitters 100 with 6 rotor magnets 802 each. Other combinations of transmitters 100 is possible, e.g., each transmitter 100 including more or less rotor magnets 802 and/or more or less transmitters 100 being connected together. In some examples, each rotor magnet 802 can be cylindrical and the full transmitter 100 can use four cuboidal stators magnets 800. Each sub-array can act as a single dipole and are stacked vertically with opposite orientation. This helps reduce the DC magnetic field around the transmitter and significantly improves handling and storage during non-operational periods (FIG. 12). FIG. 12 is an example comparative plot showing the DC magnetic field around the transmitter system with 6 and 12 oscillating magnets during non-operational periods. The multi-rotor transmitter 100 (FIG. 11) has multiple resonance frequencies due to magnetic interaction between different rotor magnets 802. The in-phase mode has the highest total magnetic field output since all the rotors self-synchronize and oscillate in the same direction. FIG. 13 is an example plot showing the strength of magnetic field produced by the 12-magnet transmitter 100. In FIG. 13, an example spectrum shows the 12-magnet device which producing 0.44 fT rms at 845 Hz measured using a Cesium magnetometer positioned at 8 meters distance from the transmitter 100.

In some examples, the transmitter 100 can exploit the magnetic component of the electromagnetic (EM) field because it is the magnetic field which is capable of penetrating conductive media. In frequency ranges of interest, the background clutter for the magnetic field is lower than that of the electric field. There are many applications within the penetrating RF (<3 kHz) range that can benefit from the penetrating properties of low-frequency EM fields. Examples include, but are not limited to, underwater communications at distances to hundreds of meters and through-earth communications at distances of hundreds of meters through soil and rock of heterogeneous composition and moisture content.

The propagating RF (3 kHz-30 kHz), referred to as VLF, is known for the ability of EM waves to couple to the naturally occurring Earth-ionosphere waveguide. This coupling enables propagation of signals with very little attenuation around the globe. The Earth's waveguide is formed between the ground and the different layers of the ionosphere at 75-85 kilometers above the Earth's surface. At 10 kHz, the EM wavelength measures 30 km and the far-field starts at ~5 km from the source. Once the VLF EM field is coupled to the waveguide, it can propagate over very long distances, which allows over-the-horizon messaging. This is in contrast to high-frequencies that require line-of-sight, relaying or bouncing off the ionosphere. The transmitter 100 enables the deployment of transmitters with size and power consumption compatible with man-portable applications and capable of closing communication links at distances greater than 100 km.

A transmitter 100 for generating a carrier signal in any embodiment discussed can utilize a magnetic spring or a mechanical spring. To send data, amplitude modulation of the carrier for transmitting messages can be achieved by directly encoding the message signal to the input voltage sent to the drive coil. Example graphs of amplitude modulated signals using On-Off keying scheme received by a fluxgate magnetometer receiver at an example 20 cm distance are illustrated in FIGS. 8 and 9.

In some examples, amplitude modulation of the carrier for transmitting messages can be achieved using drive on/off keying. For a mechanical system, the magnetostatic field produced by a single rotor magnet 802 can be calculated from first principles through a dipole approximation. At a 1 km range, the greatest change in magnetic field is obtained for rotational motion of the rotor magnet 802 in the axial direction. It can thus be determined that 9.57 $Am^2$ total moment will provide 1 fT rms carrier signal at 1 km when oscillated at ULF in a torsional resonance mode with amplitude approximately +/−45 degrees (larger being better). The indicated magnetic moment requires 8.2 $cm^3$ of N52 neodymium magnet material that can be readily distributed over a number of smaller magnets without any measurable difference from the single magnet case.

The field of a permanent magnetic dipole diminishes with the cube of distance. Therefore, translational motion of a large magnet by a few mm simply cannot induce sufficient change in field at 1 km. Another approach is to exploit the spatial geometry of the magnetic field around a dipole to create sufficient changes through rotational motion. In some examples, the transmitter 100 is only dependent on the volume of magnetic material that is used, and signal strength scales linearly with increased volume. Table 1 shows example projections for the volume and weight parameters of the magnets alone for +/−20 degrees. There is flexibility in volume and weight such that appropriate suspension systems and chassis can be built within those constraints.

TABLE 1

Volume and weight - example minimum requirements for magnets

|  | 1 fT rms at 1 km | 10 fT rms at 1 km | 100 fT rms at 1 km |
| --- | --- | --- | --- |
| Volume ($cm^3$) | 13.09 | 130.9 | 1309 |
| Weight (kg) | 0.098 | 0.98 | 9.8 |

Custom Magnets and Geometry

Rotor magnets 802 can be fabricated to have different area of cross-section (square or cylindrical) achieve different operating frequency. There is no fundamental difference between a single rotor magnet 802 with the required moment, or a distribution of the total moment (total volume) over N rotor magnets 802 having dipoles oriented the same way. The transmitter 100 can be considered quasi-static at ULF, and the magnetostatics can be analyzed using superposition. There is no lifetime or operating time limitations anticipated with the approach since only permanent magnets are employed.

Temperature Tolerance and Feedback Control

Since the transmitter 100 can use permanent magnets, and operate below their Curie temperature, there are no anticipated operating issues from temperature variations over 0-70° C. From a mechanical operation perspective, thermal changes of the spring stiffness may detune the transmitter from the designed resonance, which can be resolved through the addition of a magnetostatic spring softening actuator and feedback control loop.

Design of Torsional Springs

The magnetic spring embodiment uses a magnetic interaction to cause the rotor magnet 802 to return to its default position, e.g., FIGS. 4 and 6. The magnetic restoring force can be produced using additional stator magnets 800 (e.g., stationary magnets). The stator magnets 800 are positioned near the rotor magnet 802 to create a strong enough magnetic field to cause the rotor magnet 802 to align with the field generated by the stator magnets 800 when there is no field being generated by the coil 1000. In some examples, the stator magnet 800 and the rotor magnet 802 are aligned so that a static magnetic field cancels in a vicinity of the transmitter 100, e.g., for ease of storage and handling during non-operational periods.

The mechanically-based transmitter 100 can use mechanical and/or magnetic springs for its torsional stiffness. One example of the mechanical spring embodiment (FIG. 2) can be constructed from a series of spirally arranged flexible arms, fixed at their outer rim to the frame and attached to the magnets 102 at the central hub. Any alternative mechanical spring system that can make the rotor magnet 802 return to its default position may also be used.

Actuation Method

In one example using a magnetic spring, the rotor magnet 802 is actuated by a magnetic field generated by passing an electrical current through the driving coil 1000, e.g., FIG. 6. When the driving coil 1000 generates the magnetic field, the rotor magnet 802 rotates to align with the generated magnet field. When the driving coil 1000 stops generating a magnetic field, the rotor magnet 802 rotates to align with the magnetic field generated by the stator magnets 800, e.g., as described above.

Transmitter 100 Frequency Control

Transmission frequency of the transmitter is a function of both the magnitude of the magnetic stiffness and the rotor moment of inertia. Operational frequency can be readily designed by changing the rotor-stator distance and the rotor geometry (FIGS. 10A and 10B). Translation of stator to a farther distance reduces the frequency and reduction in rotor moment of inertia increases the frequency.

In the magnetic spring embodiment, changes to the rotor magnet 802 and stator magnet 800 geometries or positions can be used to modify the magnetic interaction, and thereby adjust the magnetic spring. This can be performed dynamically. Adjusting the distance between the rotor magnet 802 and the stator magnets 800 can tune the resonance frequency of the oscillating magnet (FIGS. 3 and 10A). In some examples, a mechanical spring can be used in conjunction with the magnetic spring effect, e.g., to obtain higher angular deflection stiffness. The equation governing the magnetic spring constant (dipole approximation) between one rotor and one stator magnet is:

$$k_B = \frac{\mu_o M_1 M_2}{2\pi r^3}.$$

The torsional resonator natural frequency is:

$$\omega = \sqrt{\frac{k_B}{MoI}}.$$

Putting $k_B$ for two stators in the natural frequency equation, the required distance between magnets is:

$$r = \left(\frac{\mu_o M_1 M_2}{\pi \omega^2 MoI}\right)^{\frac{1}{3}}.$$

In FIG. 7, the left graph is the frequency response of one-magnet transmitter with rotor-stator separation 16.5 mm showing the net magnetic field (estimated at 1 km distance) sensed by a fluxgate sensor placed at 27 cm for different input voltage levels. For a given input signal, the transmitter produces maximum oscillating magnetic field at resonance. The corresponding average power consumption of the transmitter is minimum at resonance (FIG. 7, right graph) due to the equivalent RLC tank-topology of the mechanical oscillator. Nonlinearity in the magnetic torsional spring can cause the spring to stiffen with increasing drive amplitude.

The resonance frequency can also be changed by altering the moment of inertia of the rotor magnet (FIG. 10B). The operational frequency of the transmitter 100 and be increased by using any method of decreasing the moment of inertia of the rotor, not limited to reducing the rotor dimension or changing the shape of cross-section. In one example using cuboidal rotor magnets, the moment of inertia is decreased by reducing the edge length of the magnet from 12.7 mm to 3.1 mm (denoted by squares on FIG. 10B). Circular cross-section has a lower moment of inertia than a square for the same area; so cylindrical magnets can help achieve a higher resonance frequency than square magnets (denoted by circles on FIG. 10B).

Large Amplitude Torsional Oscillation.

Since the AC magnetic field obtained at the receiver increases with a larger angular deflection of the magnets, this can be a path to lowering the mass (volume) of magnets that are required. However, since a larger angular deflection increases the power requirement quadratically, the scaling equations identified above are invoked. A solution is to lower the magnet MoI, to compensate for the increased power. This compensation of the angular amplitude does not require any aggressive approach since the power reduces quadratically by a factor $N^2$ when the individual magnets are divided by N. As discussed in FIGS. 10A and 10B, this also results in higher operational frequency (FIG. 13).

Many modifications and other embodiments set forth herein can come to mind to one skilled in the art having the benefit of the teachings presented in the foregoing descriptions and the associated drawings. Although specified terms are employed herein, they are used in a generic and descriptive sense only and not for purposes of limitation.

What is claimed is:

1. A low-frequency magnetic field transmitter, comprising:
   at least one rotor magnet mounted on an axle, the axle configured to rotate the at least one rotor magnet, wherein the axle being connected to a restoring spring that is configured to return the axle to a default position; and
   wherein in response to rotation of the axle, at least one rotor magnet rotates and undergoes angular motion, creating time-periodic oscillation of a magnetic dipole and modulation of a magnetic field.

2. The low-frequency transmitter of claim 1, wherein the restoring spring comprises at least one of a mechanical spring and a magnetic spring.

3. The low-frequency transmitter of claim 2, wherein the mechanical spring and the magnetic spring are used together to obtain higher torsional stiffness.

4. The low-frequency transmitter of claim 2, wherein the magnetic spring is produced using the magnetic interaction of the rotor magnet with one or more stator magnets.

5. The low-frequency transmitter of claim 1, wherein the rotation of the rotor generates a time varying magnetic field at a receiver located a distance away.

6. The low-frequency transmitter of claim 1, wherein the transmitter includes a plurality of rotor magnets coupled to a plurality of axles.

7. The low-frequency transmitter of claim 1, wherein the modulation of the magnetic field comprises at least one of amplitude modulation and frequency modulation.

8. The low-frequency transmitter of claim 7, wherein an amplitude of the angular motion is varied to encode information.

9. The low-frequency transmitter of claim 7, wherein a frequency of the angular motion is varied to encode information.

10. The low-frequency transmitter of claim 1, wherein the operational frequency is changed by varying distance between the rotor magnet to stator magnets.

11. The low-frequency transmitter of claim 1, wherein the operational frequency is changed by varying a geometry of at least one of the rotor magnet and the stator magnets.

12. The low-frequency transmitter of claim 1, wherein the stator magnet and the rotor magnet are aligned so that a static magnetic field cancels in a vicinity of the transmitter.

13. A method, comprising:
    generating a first force or torque to rotate a rotor magnet on an axle away from a default position;
    generating a second force or torque to return the rotor magnet to the default position;
    creating time-periodic oscillation of a magnetic dipole and modulation of a magnetic field based on the rotation and return of the rotor magnet.

14. The method of claim 13, where the force or torque is generated using a time-varying magnetic field.

15. The method of claim 14, where the time-varying magnetic field is generated by passing a current through a coil.

16. The method of claim 13, where the force or torque is applied through a piezoelectric actuator.

17. The method of claim 13, where the force or torque are applied through an electrostatic actuator.

18. The method of claim 13, where the second force is generated by a magnetic spring.

19. The method of claim 13, where the second force is generated by a mechanical spring.

20. The method of claim 13, where the second force is generated by a stator magnet.

* * * * *